W. T. PULLIAM.
WIND MOTOR.
APPLICATION FILED JULY 25, 1911.
1,025,720.
Patented May 7, 1912.
5 SHEETS—SHEET 1.
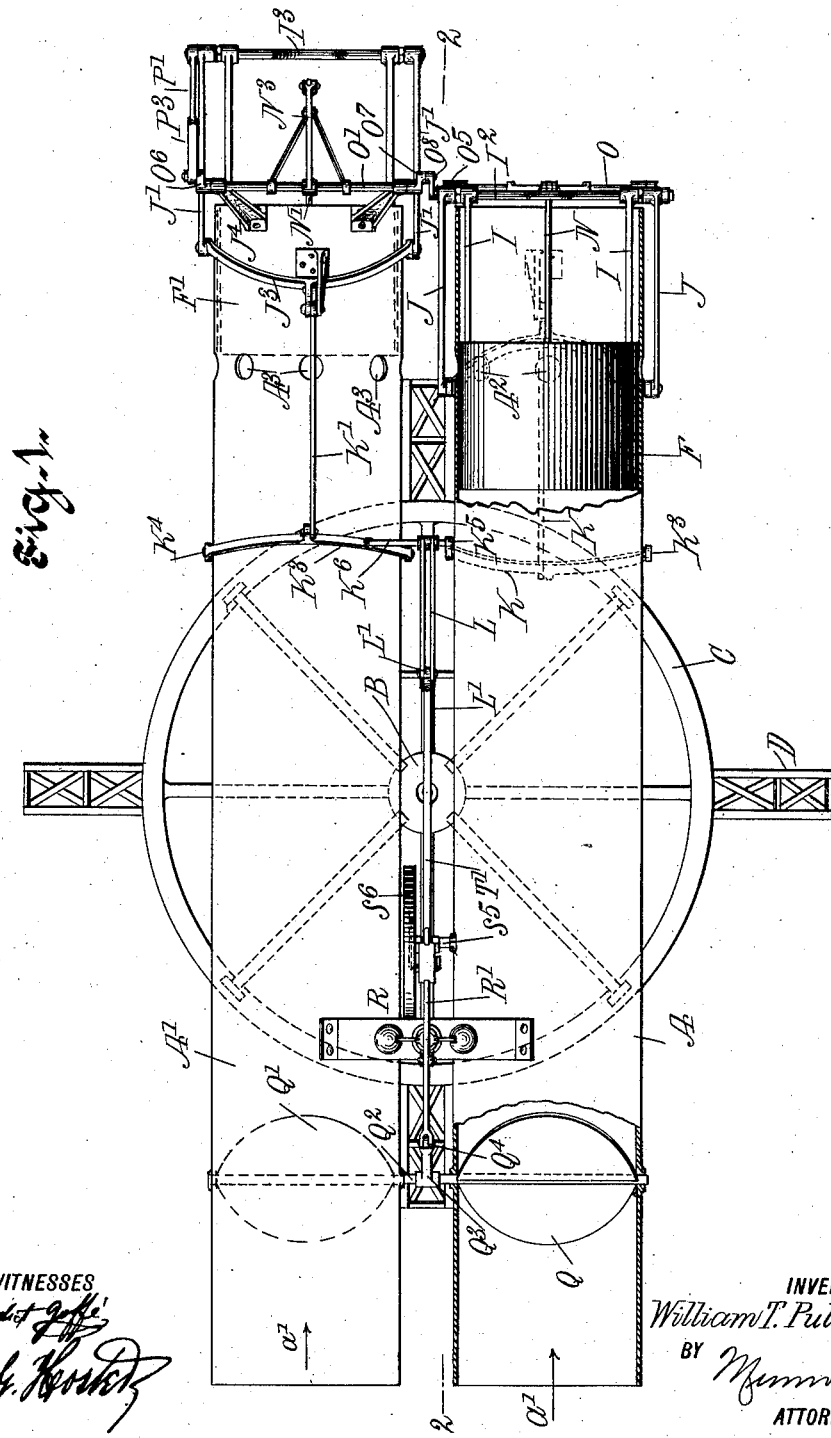
WITNESSES
INVENTOR
William T. Pulliam
BY
ATTORNEYS

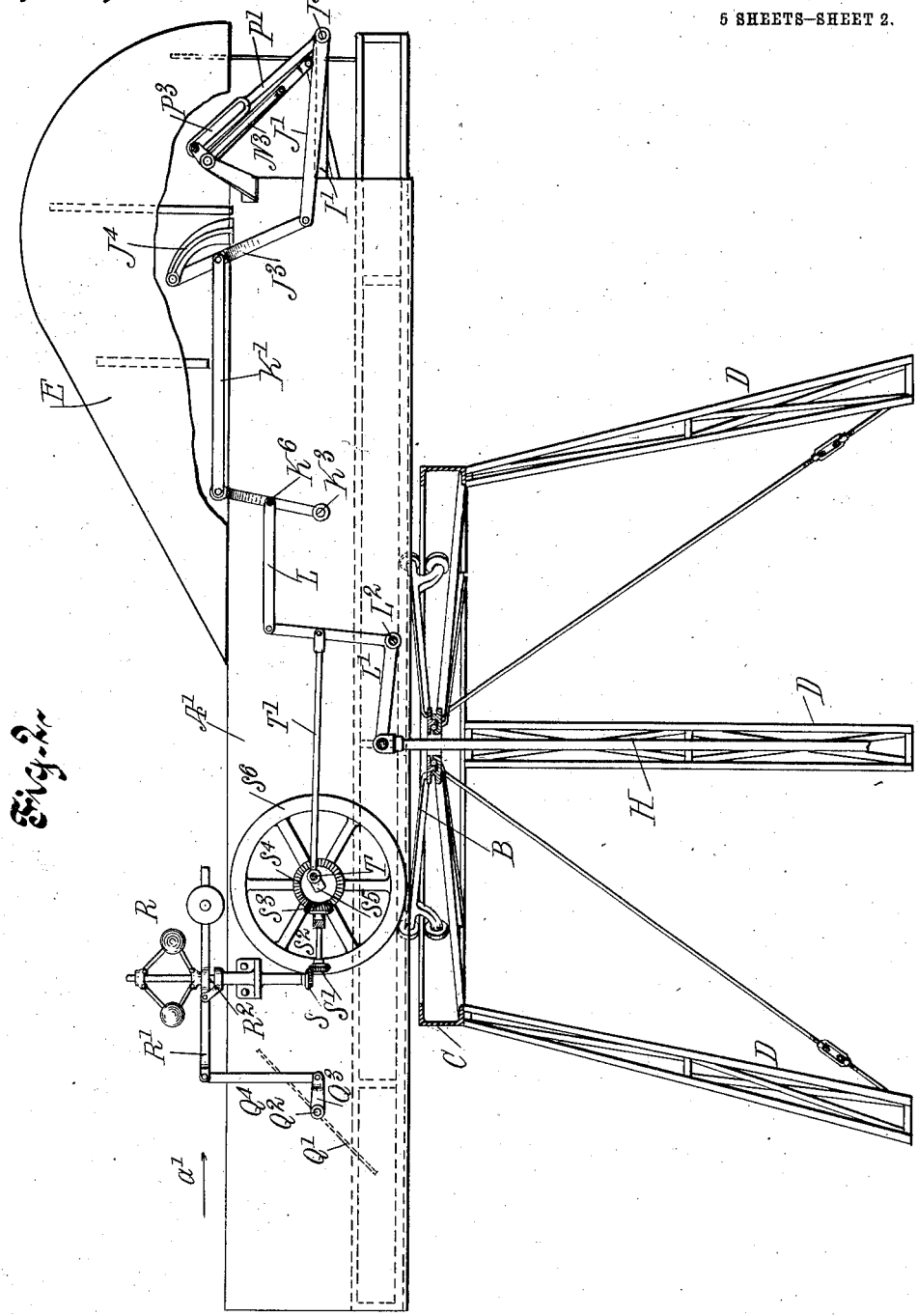

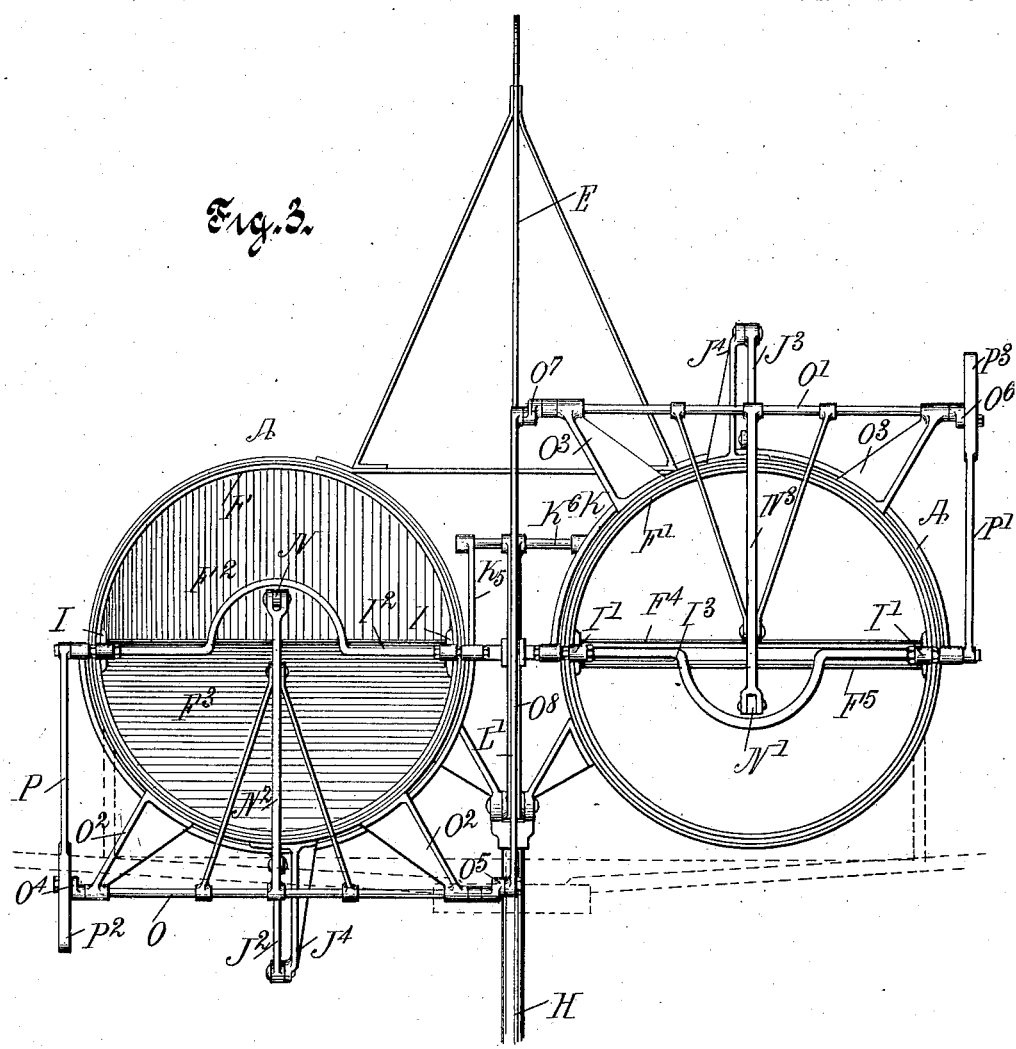

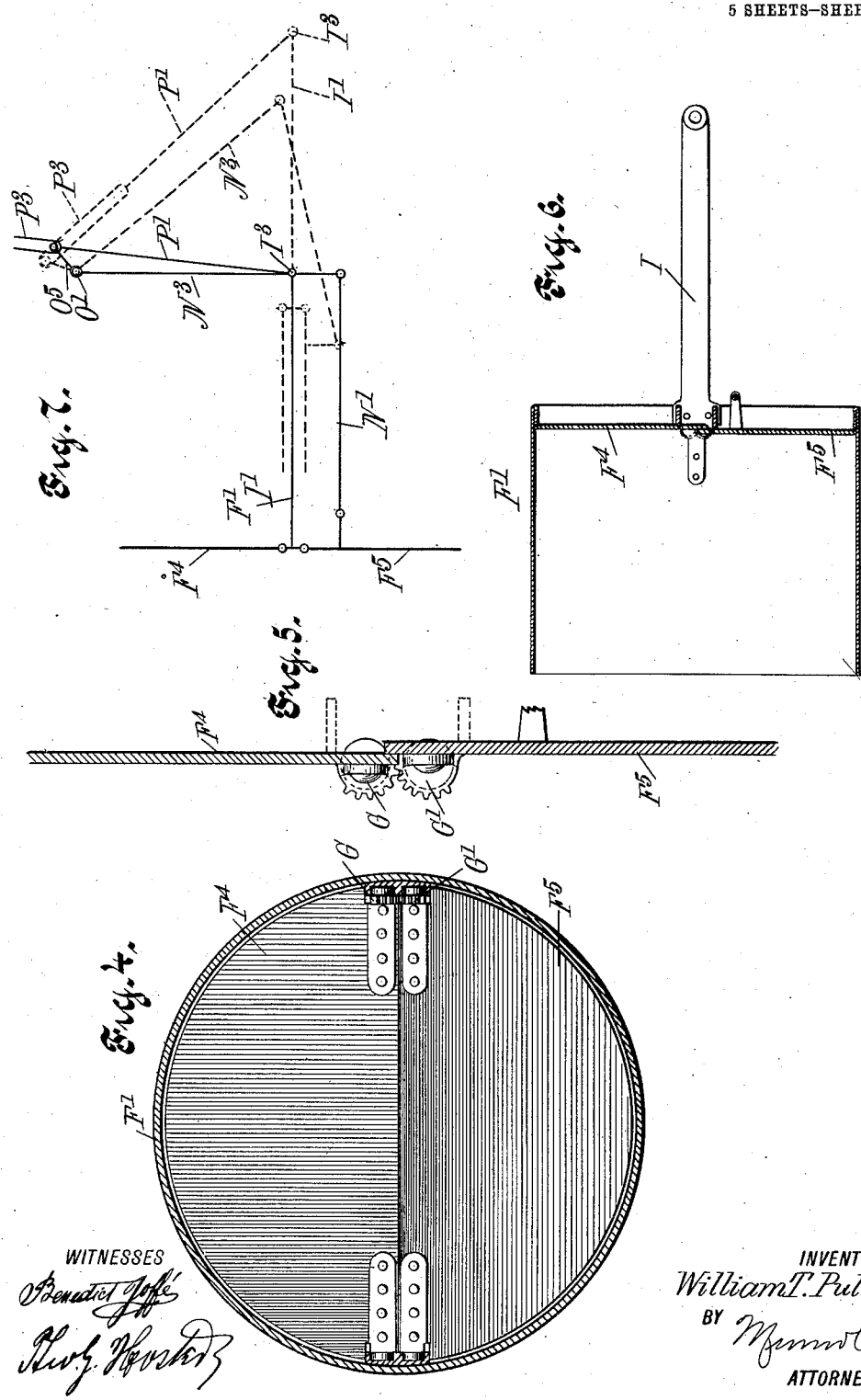

W. T. PULLIAM.
WIND MOTOR.
APPLICATION FILED JULY 25, 1911.
1,025,720.
Patented May 7, 1912.
5 SHEETS—SHEET 5.
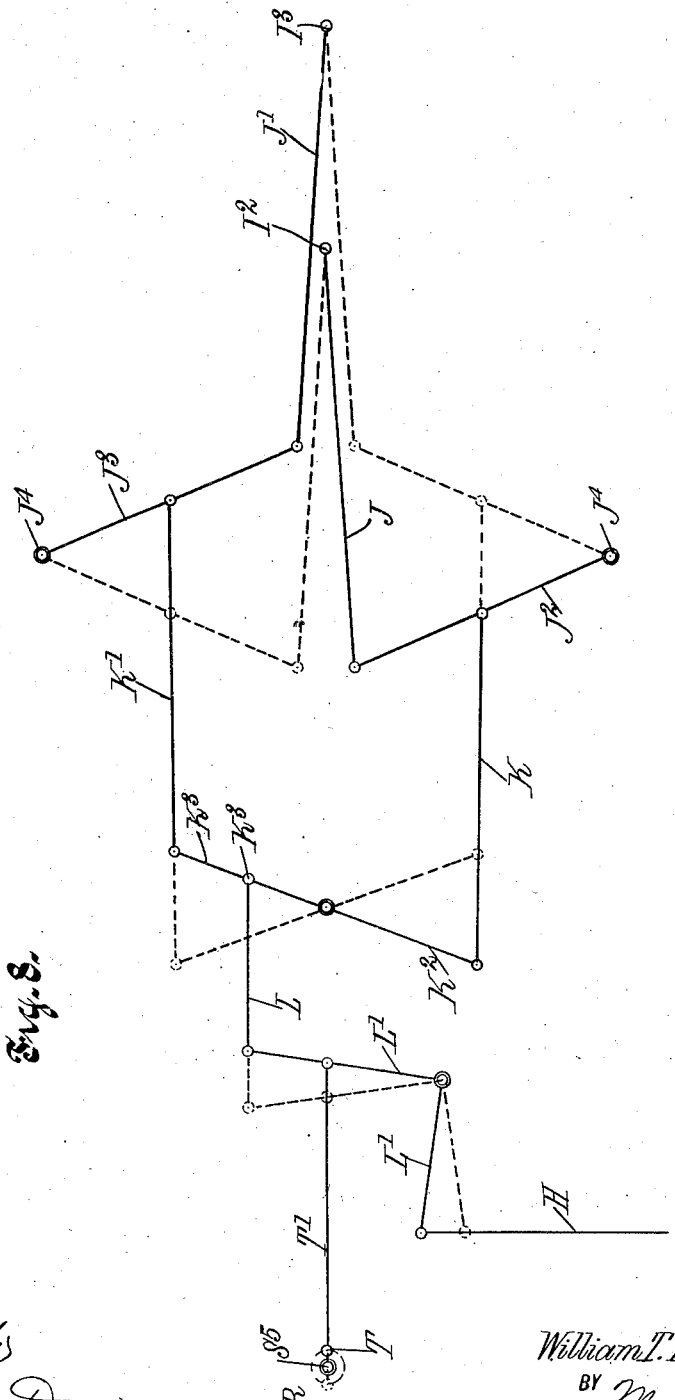
WITNESSES
INVENTOR
William T. Pulliam
BY
ATTORNEYS

UNITED STATES PATENT OFFICE.

WILLIAM T. PULLIAM, OF TUSCOLA, ILLINOIS.

WIND-MOTOR.

1,025,720.   Specification of Letters Patent.   Patented May 7, 1912.

Application filed July 25, 1911. Serial No. 640,434.

*To all whom it may concern:*

Be it known that I, WILLIAM T. PULLIAM, a citizen of the United States, and a resident of Tuscola, in the county of Douglas and State of Illinois, have invented a new and Improved Wind-Motor, of which the following is a full, clear, and exact description.

The object of the invention is to provide a new and improved wind motor for actuating pumps or driving other machinery and devices, and arranged to utilize the kinetic energy of the wind to the fullest advantage.

For the purpose mentioned, use is made of a pair of parallel cylinders, in which reciprocate in opposite directions pistons having piston heads adapted to open and to close, the pistons being connected with the mechanism to be driven, and opening and closing means are provided for alternately opening and closing the said piston heads on the latter reaching a rearmost position. and at the time the pressure is relieved in the cylinders by escape of air through air outlets formed in the cylinders and covered and uncovered by the said pistons.

A practical embodiment of the invention is represented in the accompanying drawings forming a part of this specification, in which similar characters of reference indicate corresponding parts in all the views.

Figure 1 is a plan view of the wind motor, parts being shown in section, and the vane being omitted; Fig. 2 is a sectional side elevation of the same on the line 2—2 of Fig. 1; Fig. 3 is an enlarged rear end elevation of the wind motor; Fig. 4 is a face view of one of the pistons with the head in closed position; Fig. 5 is an enlarged cross section of the sectional piston head of a piston; Fig. 6 is a sectional side elevation of one of the pistons with the sectional piston head in closed position; Fig. 7 is a diagrammatic view showing a sectional piston head and the means for opening and closing the same; and Fig. 8 is a diagrammatic view showing the transmission of the power from the piston heads to the machine mechanism or device to be actuated as well as the governor for controlling the air to the cylinders.

A pair of parallel cylinders A and A' are attached to a turntable B mounted to turn on a circular track C held on a support D, such as a tower or the like. and between the cylinders A and A' and attached to the same is arranged a longitudinally-extending main vane E for holding the forward or entrance ends of the cylinders A and A' at all times to the wind so that the latter can pass into the cylinders A and A' in the direction of the arrow $a'$. The cylinders A and A' are open at both ends and are provided near their rear ends with air outlet openings $A^2$, $A^3$, and in the rear portions of the cylinders A and A' are mounted to reciprocate hollow pistons F and F' provided at their rear ends with piston heads made in sections $F^2$, $F^3$ and $F^4$, $F^5$, the sections $F^2$ and $F^3$ being pivoted in such a manner as to swing forward into an open position or backward into a closed position, and the sections $F^4$, $F^5$ of the piston head for the piston F' are similarly mounted. The pivots of the piston head sections $F^2$ and $F^3$ are connected with each other by segmental gear wheels G and G' so that the sections swing in unison into an open or closed position. Similar segmental gear wheels G, G' are arranged on the pivots for the piston head sections $F^4$, $F^5$, to cause the latter to swing in unison into an open and closed position. The pistons F and F' reciprocate in opposite directions, and when a piston is in a rearmost position it uncovers the air outlet openings $A^2$ or $A^3$ in its corresponding cylinder A or A', and when a piston F or F' moves forward it covers up the corresponding air outlet openings $A^2$ or $A^3$. During the forward stroke of the piston F or F', the sections of its piston head are open so as to offer as little resistance to the air passing through the cylinder at the time, but during the return or rearward stroke of a piston F or F' the sections of its piston head are closed so that the pressure of the wind is exerted against such piston head to move the same rearward in the cylinder A, and when the rearwardly-moving piston head has uncovered the openings $A^2$ or $A^3$ then the sections of its piston head begin to open to allow the free passage of the air through the corresponding cylinder.

The pistons F and F' are connected with the pump rod H or other mechanism to be driven, and for this purpose the pistons F and F' are provided with rearwardly-extending arms I, I', of which the arms I are connected with each other by a cross rod $I^2$ and the arms I′ are connected with each other by a cross rod I³. The cross rods I² and I³ are connected by links J, J′ with levers J², J³ fulcrumed on brackets J⁴ attached to the cylinders A and A′, and the levers J² and J³ are connected by links K and K′ with levers K², K³ pivoted at K³, K⁴ on the sides of the cylinders A and A′, the levers K² and K³ being approximately semicircular, and the lever K² extending underneath the cylinder A while the lever K³ extends across the top of the cylinder A′. The lever K² is provided at its inner end with an upwardly-extending arm K⁵ rigidly connected by a transverse pin K⁶ with the lever K³, and the pin K⁶ is pivotally connected by a link L with a bell crank lever L′ fulcrumed at L² on the cylinders A and A′ and pivotally connected with the pump rod H. Now when the pistons F and F′ reciprocate in the cylinders A and A′ motion is transmitted by the mechanism just described to the pump rod H so as to move the same up and down.

In order to open and close the sections F², F³ and F⁴, F⁵ of the piston heads for the pistons F and F′, the following arrangement is made: The rear faces of the piston head sections F² and F⁵ are pivotally connected by links N and N′ with arms N², N³ secured to transversely-extending crank shafts O and O′ journaled in suitable bearings O² and O³ secured to the exterior of the cylinders A and A′, the bearings O² being arranged on the under side of the cylinder A while the bearings O³ are arranged on the top of the cylinder A′. The crank shaft O is provided at its ends with cranks O⁴ and O⁵, and similar cranks O⁶ and O⁷ are arranged on the ends of the crank shaft O′, and the cranks O⁵ and O⁷ (see Fig. 3) are connected with each other by a link O⁸ so that the crank shafts O and O′ rock in unison. On the cross rods I², I³ are pivoted links P and P′ provided with slotted ends P², P³ engaging the cranks O⁴ and O⁶ of the crank shafts O and O′. When the piston F is on the power stroke, that is, moves rearwardly with the piston head sections F² and F³ in closed position, then the piston F′ moves forwardly with the piston head sections F⁴, F⁵ in open position, and when the piston F nears the ends of its rearward or power stroke and uncovers the openings A² then at this time the link N and arm N² has turned the rock shaft O sufficiently to move the crank O⁴ to engage the terminal of the slotted end P² of the link P which moves rearwardly with the cross rod I² so that a further rearward movement of the piston F holds the crank shaft O against turning, whereby the arm N² and link N swing the piston head section F² and with its its mate F³ into an open position. At the same time that this movement takes place, a reverse movement takes place on the forwardly moving piston F′ in which the piston head sections F⁴, F⁵ are swung into a closed position by the rocking of the shaft O′ and the connection of the latter by the arm N³ and the link N′ with the piston head section F⁵, and the connection of the link P′ on the cross rod I³ with the crank O⁶ of the rock shaft O′. The movement of the parts described is diagrammatically illustrated in Fig. 7, to which special reference is had.

From the foregoing it will be seen that when a piston F or F′ nears the end of its rearward or power stroke, the corresponding air outlets A² or A³ are opened to relieve the closed piston head of pressure, with a view to permit of swinging the corresponding piston head sections F², F³ or F⁴, F⁵ into an open position. In a like manner when the piston F or F′ nears the end of its forward stroke with the piston head sections F², F³ or F⁴, F⁵ in open position, then such sections are closed to allow the air that passes into the cylinder A to exert full pressure against such closed piston head, as air cannot escape through the openings A², A³, as the latter are cut off soon after the piston F or F′ starts on the return or forward stroke.

In the forward or entrance ends of the cylinders A and A′ are arranged the regulating valves Q and Q′ to control the amount of air passing into the cylinders to act on the pistons as above explained. The valves Q and Q′ are preferably in the shape of dampers secured on a transversely-extending shaft Q² journaled in suitable bearings arranged on the cylinders A and A′. On the shaft Q² at a point between the cylinders A and A′ is secured an arm Q³ connected by a link Q⁴ with a weighted lever R′ forming part of a governor R driven from the bell crank lever L′, previously mentioned, and connected with the pump rod H. The governor R may be of any approved construction, and the governor shaft R² is provided at its lower end with a bevel gear wheel S in mesh with a bevel gear wheel S′ secured on the shaft S² journaled in suitable bearings attached to the cylinders A and A′. On the shaft S² is secured the bevel gear wheel S³ in mesh with a bevel gear wheel S⁴ secured on a shaft S⁵ journaled in bearings arranged on the cylinders A and A′, and on the shaft S⁵ is secured a fly wheel S⁶. The shaft S⁵ is also provided with a crank arm T connected by a link T′ with the vertical upright arm of the bell crank lever L′, so that when a rocking motion is given to the said bell crank lever L′, as previously explained, then a rotary motion is given to the shaft S⁵ by the action of the link T′ and the crank T. A rotary motion of the shaft S⁵ is transmitted by the gear described and shown in Fig. 2 to the gear shaft R² of the governor R, which latter actuates the lever R', and the latter opens or closes the valves Q and Q' more or less according to the speed of the governor R. Thus when the governor R runs at a high rate of speed, the valves Q and Q' are moved into a closing position to reduce the amount of air passing into the rear portions of the cylinders A and A' to reduce the pressure against the pistons F and F' until the wind motor runs slow, and when this takes place a corresponding reduction in the speed of the governor R causes a reverse movement of the valves Q and Q' to admit more air to the rear portions of the cylinders A and A' until the wind motor runs at a normal rate of speed.

Having thus described my invention, I claim as new and desire to secure by Letters Patent:

1. A wind motor, comprising a pair of parallel cylinders open at the ends and provided near the rear ends with air outlets, pistons mounted to reciprocate in the rear portions of the said cylinders and in opposite directions one relative to the other, the pistons being adapted to open and to close the said air outlets, and each of the said pistons having pivoted piston heads adapted to open and to close, piston rods extending from the said pistons rearwardly to the outside of the cylinders, the piston rods of each piston carrying a cross rod, actuating means connected with the said cross rod and with the mechanism to be driven, crank shafts journaled exteriorly on the cylinders, links pivoted on the cross rods and having slotted connections with the cranks of the said crank shafts, and link and arm connections between the said piston heads and the said crank shaft.

2. A wind motor, comprising a pair of parallel cylinders open at the ends and provided near the rear ends with air outlets, pistons mounted to reciprocate in the rear portions of the said cylinders and in opposite directions one relative to the other, the pistons being adapted to open and close the said air outlets, and each of the said pistons having pivoted piston heads adapted to open and close, piston rods extending from the said pistons rearwardly to the outside of the cylinders, the piston rods of each piston carrying a cross rod, actuating means connected with the said cross rod and with the mechanism to be driven, crank shafts journaled exteriorly on the cylinders, links pivoted on the cross rods and having slotted connections with the cranks of the said crank shafts, arms fixed on the said crank shafts, and links connecting the said arms with the piston heads.

3. A wind motor, comprising a pair of parallel cylinders open at the ends and provided near the rear ends with air outlets, pistons mounted to reciprocate in the rear portions of the said cylinders and in opposite directions one relative to the other, the pistons being adapted to open and close the said air outlets, and each of the said pistons having pivoted piston heads adapted to open and close, gear wheels connecting the pivots of the piston heads of each piston with each other to simultaneously open or close the piston heads of a piston, piston rods extending rearwardly from the said pistons and carrying cross rods, crank shafts journaled exteriorly on the said cylinders, links pivoted on the said cross rods and having slotted ends engaging the cranks of the said crank shafts, arms secured on the said crank shafts, and links connecting the said crank shaft arms with one of the piston heads of each piston.

4. A wind motor, comprising a pair of parallel cylinders open at the ends and provided near the rear ends with air outlets, pistons mounted to reciprocate in the rear portions of the said cylinders and in opposite directions one relative to the other, the pistons being adapted to open and close the said air outlets, and each of the said pistons having pivoted piston heads adapted to open and close, gear wheels connecting the pivots of the piston heads of each piston with each other, to simultaneously open or close the piston heads of a piston, piston rods extending rearwardly from the said pistons and carrying cross rods, crank shafts journaled exteriorly on the said cylinders, links pivoted on the said cross rods and having slotted ends engaging the cranks of the said crank shafts, arms secured on the said crank shafts, links connecting the said crank shaft arms with one of the piston heads of each piston, a pump rod, and a lever mechanism connecting the said pump rod with the said cross rods.

5. A wind motor, comprising a pair of parallel cylinders open at the ends and provided near the rear ends with air outlets, pistons mounted to reciprocate in the rear portions of the said cylinders and in opposite directions one relative to the other, the pistons being adapted to open and close the said air outlets, and each of the said pistons having pivoted piston heads adapted to open and close, gear wheels connecting the pivots of the piston heads of each piston with each other to simultaneously open or close the piston heads of a piston, piston rods extending rearwardly from the said pistons and carrying cross rods, crank shafts journaled exteriorly on the said cylinders, links pivoted on the said cross rods and having slotted ends engaging the cranks of the said crank shafts, arms secured on the said crank shafts, links connecting the said crank shaft arms with one of the piston heads of each piston, a pump rod, a lever mechanism connecting the said pump rod with the said cross rods, regulating valves in the entrance ends of the cylinders, a governor for controlling the said regulating valves, and a connection between the said lever mechanism and the said governor.

In testimony whereof I have signed my name to this specification in the presence of two subscribing witnesses.

WILLIAM T. PULLIAM.

Witnesses:
JAS. S. REAT,
THOS. E. SHAW.

Copies of this patent may be obtained for five cents each, by addressing the "Commissioner of Patents, Washington, D. C."